350-432

3/4/86 OR 4,573,769

United States Patent [19]

Clarke

[11] Patent Number: 4,573,769

[45] Date of Patent: Mar. 4, 1986

[54] PROJECTION LENS SYSTEM

[75] Inventor: John A. Clarke, Carshalton, England

[73] Assignee: U.S. Philips Corporation, New York, N.Y.

[21] Appl. No.: 628,376

[22] Filed: Jul. 5, 1984

[30] Foreign Application Priority Data

Jul. 25, 1983 [GB] United Kingdom ................. 8319938

[51] Int. Cl.[4] ......................... G02B 9/06; G02B 17/08

[52] U.S. Cl. ..................................... 350/432; 350/443

[58] Field of Search ........................ 350/432, 480, 443

[56] References Cited

U.S. PATENT DOCUMENTS 2,637,242 5/1953 Osterberg et al. .................. 350/432

*Primary Examiner*—John K. Corbin
*Assistant Examiner*—Rebecca D. Gass
*Attorney, Agent, or Firm*—Joseph P. Abate

[57] ABSTRACT

A lens system is provided which is suitable for back-projecting an enlarged image of a TV cathode ray tube (CRT). To achieve a compact cabinet design 1 for such a projection television set, a short projection throw and a wider projection angle are required, together with a wide aperture (F/1) for a bright projected picture and with a definition sufficient to resolve 625 line television pictures. The lens system comprises a concave CRT face plate FP and only two lens elements L1, L2, each of positive power and each having one aspheric surface, the powers of the elements being chosen so that $$0.4K < K_1 < 0.60K \text{ and}$$

$$0.75K < K_2 < 1.05K$$

where $K_1$ is the power of the element remote from the object surface, $K_2$ is the power of the element adjacent the object surface and K is the total power of the projection lens system.

7 Claims, 8 Drawing Figures

PROJECTION LENS SYSTEM

BACKGROUND OF THE INVENTION

This invention relates to projection lenses and, more particularly, relates to lenses designed to project an enlargement of an image on a cathode ray tube (CRT) such as a phosphor screen of a television set.

In three tube color projection television systems, it is often not necessary to correct the chromatic aberration of each projection lens due to the limited spectral bandwidth of each CRT, thus simplifying lens design to some extent. If a CRT with a flat face plate is used, then a steeply curved field flattener is often necessary adjacent to the face plate to correct Petzval curvature. Such designs are disclosed in U.S. Pat. No. 4,348,081 in which some of the lens elements have aspheric surfaces. In such designs, the field flattener has two disadvantages. Firstly, the steep curve of the field flattener at the edges of the picture means that high angles of incidence occur, rendering aberration correction difficult and producing brightness reduction due to light lost by reflection at the steeply curving surface. Secondly, projection CRT's are usually run at high screen loadings in order to produce an adequately bright picture for viewing. In consequence, the phosphor can be raised in temperature and thermal quenching of the phosphor can occur, reducing picture brightness with increasing temperature. If the field flattener is in optical contact with the CRT face plate, the effective thickness of the face plate varies considerably across the picture, being especially thick at the picture edges. Face plate cooling is then not constant over the picture and, hence, phosphor temperature is not constant over the picture, producing picture brightness variations via thermal quenching. The field flattener may therefore be separated from the face plate and a coolant circulated between them, incurring additional complexity.

In British Patent Application No. 2,091,898A, the optical problem of the field flattener is largely solved by using a cathode ray tube having a face plate which is concave towards the projection lens. The face plate glass may be strengthened, for example, by surface ion exchange, so that it can withstand atmospheric pressure on the concave surface. A single element lens having both surfaces aspherized is used together with a solid prism beam combiner for projecting the images from all three of the CRT's. However, the prism has convex surfaces fitting the concave CRT face plates, rendering cooling difficult.

SUMMARY OF THE INVENTION

It is an object of the invention to simplify beam combining, provide cooling access to face plates of substantially constant thickness and to provide high quality imaging out to the picture edges with a wide aperture lens having a short projection throw.

The invention provides a lens system for projecting an image of a concave object surface onto a planar display screen, characterized in that the projection lens comprises two elements, each of positive power and each having one aspheric surface, the powers of the elements being chosen so that $$0.40K < K_1 < 0.60K \text{ and}$$

$$0.75K < K_2 < 1.05K$$

where $K_1$ is the power of the element remote from the object surface, $K_2$ is the power of the element adjacent the object surface and K is the total power of the projection lens, each aspheric surface being defined by the following relationship:

$$Z = \frac{Cs^2}{1 + \sqrt{1 - \epsilon C^2 s^2}} + a_4 s^4 + a_6 s^6 + a_8 s^8 + a_{10} s^{10}$$

where Z is a deviation, in the axial direction, of the surface from a plane normal to the optical axis and tangent to the surface at its pole for a zone of the surface which is at a distance s from the axis, C is a curvature of the surface on the axis, $\epsilon$ is a conic constant, and $a_4$, $a_6$, $a_8$ and $a_{10}$ are constants for the surface.

A lens system in accordance with the invention may be characterized in that the lens system is folded by a plane mirror inserted between the two transmissive elements at an angle to the optical axis.

In projection television sets, the image may be projected onto a translucent screen from the back, the CRT and lens being behind the screen and within a free standing cabinet, the front of which comprises the screen. It is desirable to reduce the depth of the cabinet as much as possible and at least below a value such that the T.V. set can easily pass through ordinary living room doors. Folding mirrors are usually used within the cabinet to reduce the depth. Using a lens in accordance with the invention the number of folding mirrors can be reduced because th projection distance, or throw, from the lens to the screen is reduced and because a wide projection angle is provided so that the projected picture size is maintained. It may be an advantage if the lens itself can be folded. This can be done if sufficient clearance is provided between two adjacent elements of the lens so that a folding mirror can be inserted between them. Using a lens system in accordance with the invention, there is provided a projection television system comprising a cathode ray tube having a face plate concave towards the direction of the projected image. Also, using a lens system in accordance with the invention, there is provided a color television projection system comprising first, second and third cathode ray tubes having red, blue and green phosphors respectively provided on concave face plates, a lens system associated with each cathode ray tube, each lens system being arranged to project an image of the concave face plate onto a common display screen.

BRIEF DESCRIPTION OF THE DRAWING

Embodiments of the invention will now be described, by way of example, with reference to the accompanying drawings, in which.

DESCRIPTION OF THE PREFERRED EMBODIMENTS

Figure 1:
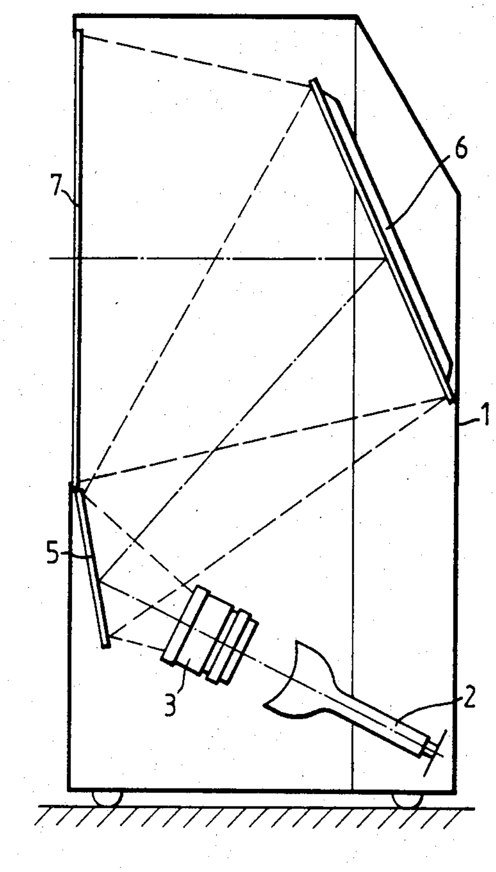
FIGS. 1 and 2 show typical layouts of projection television systems to which a lens system in accordance with the invention may be applied.
Figure 2:
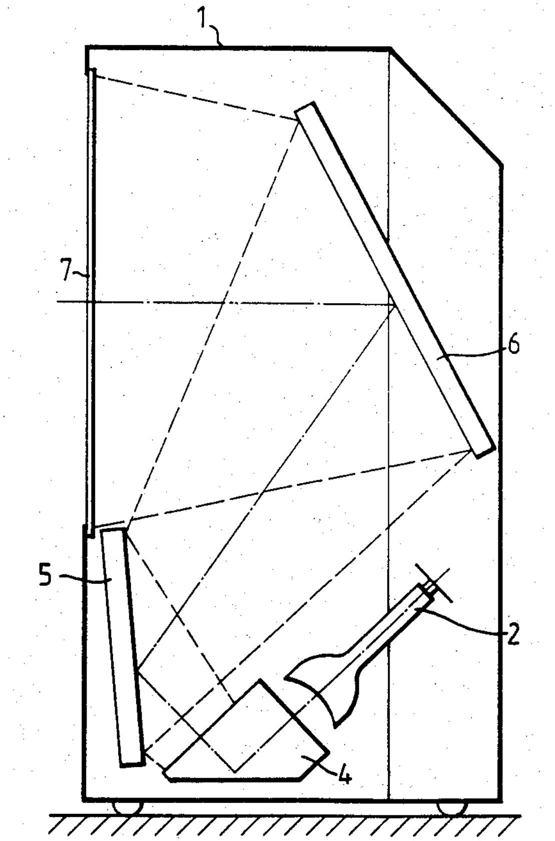

Referring to FIGS. 1 and 2, a free standing cabinet 1 contains a back projection television display system comprising a cathode ray tube (CRT) 2 having a face plate concave towards a projection lens 3 or 4, front metallized folding mirrors 5 and 6 and a translucent projection screen 7. The screen may be a Fresnel screen and may also have a light scattering power which is less in the vertical plane than in the horizontal plane to avoid wasting projected light. In FIG. 2, the projection lens 4 is folded, there being a folding mirror between two adjacent elements of the lens. For color television, three CRTs and three lenses are used in line normal to the plane of the drawing. Mirrors 5 and 6 are then extended in the direction normal to the drawing to accept light from all three CRTs. The outermost CRTs and lenses are inclined inwards so that the projected red, blue and green rasters are brought into coincidence on the screen 7.

Figure 3:
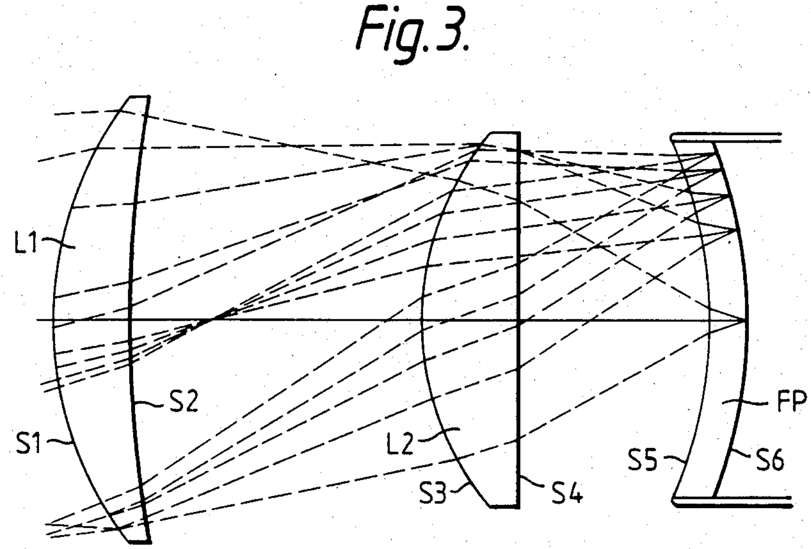
FIGS. 3 and 4 show two lens systems in accordance with the invention.
Figure 4:
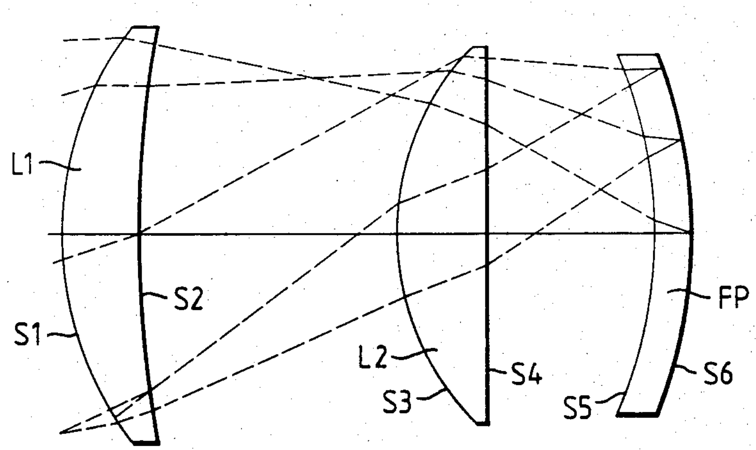

The projection lens 3 or 4 for such a television display screen can be realized by using only two lens elements each having one aspheric surface. Such a lens has adequate quality for 525 line or 625 line television. The Petzval curvature of the lens fits the concave CRT face plate closely, removing the need for a field flattener. FIGS. 3 and 4 show two designs having different projection angles measured across the picture diagonal. The lens elements are designated by L followed by a numeral indicating the sequential position of the element from the image or projection screen end to the CRT face plate FP. The surfaces of the elements are designated by S followed by a numeral in the same sequence as the elements. Positive surfaces are convex towards the projection screen and negative surfaces are concave towards the projection screen.

The powers of the two elements are within the ranges given by:

$$0.40K < K_1 < 0.60K \text{ and}$$

$$0.75K < K_2 < 1.05K$$

where K is the power of the whole lens equal to the reciprocal of its focal length and $K_1$ and $K_2$ are the powers of the two elements equal to the reciprocal of their respective focal lengths, both elements being of positive power and being generally convex towards the projection screen. Both elements correct for aperture dependent aberrations as well as providing some of the overall positive power of the lens. Both elements have one aspheric surface for detailed aberration correction. Surfaces S2 and S4 are aspherized in both designs. The aspheric surfaces are defined by the expression $$Z = \frac{Cs^2}{1 + \sqrt{1 - \epsilon C^2 s^2}} + a_4 s^4 + a_6 s^6 + a_8 s^8 + a_{10} s^{10}$$

where Z is the deviation, in the axial direction, of the surface from a plane normal to the optical axis and tangent to the surface at its pole for a zone of the surface which is at a distance s from the axis, C is the curvature of the surface at the pole, $\epsilon$ is a conic constant and $a_4$, $a_6$, $a_8$ and $a_{10}$ are constants for the surface. The first term of Z defines the basic shape of the whole surface. If $\epsilon$ has the value 1, the basic shape is a sphere. For parabolic, ellipsoidal or hyperbolic basic shapes, $\epsilon$ has the values 0, between 0 and 1 or less than 0, respectively.

The following Tables I and II give the detailed design of the embodiments of FIGS. 3 and 4, respectively.

TABLE I

| | |
|---|---|
| Focal length 14.0 cm. | Relative aperture f/0.94 |
| Projection angle ±23.7°. | Throw 1.3 m. |
| Wavelength 525 nm. | Magnification 9X. |

| | | Polar radius, cm | Axial thickness, cm | Axial separation, cm | Refractive index |
|---|---|---|---|---|---|
| L1 | S1 | 12.603 | — | — | — |
| | S2 | 70.920 | 2.500 | — | 1.5756 |
| L2 | S3 | 10.005 | — | 9.763 | — |
| | S4 | −77.270 | 3.227 | — | 1.5756 |
| FP | S5 | −15.015 | — | 6.343 | — |
| | S6 | −15.748 | 1.200 | — | 1.5200 |

Aspheric surfaces: S2, S4

| | S2 | S4 |
|---|---|---|
| C | 0.0141 | −0.0129 |
| $\epsilon$ | 0 | 0 |
| $a_4$ | $+0.7023 \times 10^{-4}$ | $+0.1526 \times 10^{-3}$ |
| $a_6$ | $-0.1330 \times 10^{-7}$ | $-0.1411 \times 10^{-6}$ |
| $a_8$ | $+0.7157 \times 10^{-10}$ | $-0.1822 \times 10^{-7}$ |
| $a_{10}$ | $+0.2866 \times 10^{-11}$ | $+0.1406 \times 10^{-9}$ |

Element values:

| | Focal length, cm | Power, $cm^{-1}$ | Relative Power |
|---|---|---|---|
| L1 + L2 | 14.045 | 0.0712 | 1 |
| L1 | 26.216 | 0.0381 | 0.54 |
| L2 | 15.600 | 0.0641 | 0.90 |

TABLE II

| | |
|---|---|
| Focal length 12.821 cm. | Relative aperture f/0.94 |
| Projection angle ±25.7°. | Throw 1.19 m |
| Wavelength 525 nm. | Magnification 9X. |

| | | Polar radius, cm | Axial thickness, cm | Axial separation, cm | Refractive index |
|---|---|---|---|---|---|
| L1 | S1 | 10.853 | — | — | — |
| | S2 | 45.996 | 2.500 | — | 1.5756 |
| L2 | S3 | 8.839 | — | 8.704 | — |
| | S4 | −88.028 | 2.911 | — | 1.5756 |
| FP | S5 | −13.699 | — | 5.687 | — |
| | S6 | −15.016 | 1.200 | — | 1.5200 |

Aspheric surfaces: S2, S4

| | S2 | S4 |
|---|---|---|
| C | 0.0217 | −0.0114 |
| $\epsilon$ | 0 | 0 |
| $a_4$ | $+0.1021 \times 10^{-3}$ | $+0.2400 \times 10^{-3}$ |
| $a_6$ | $+0.3952 \times 10^{-7}$ | $-0.1089 \times 10^{-5}$ |
| $a_8$ | $+0.3938 \times 10^{-9}$ | $-0.2332 \times 10^{-7}$ |
| $a_{10}$ | $+0.8644 \times 10^{-11}$ | $+0.3722 \times 10^{-9}$ |

Element values:

| | Focal length, cm | Power, $cm^{-1}$ | Relative Power |
|---|---|---|---|
| L1 + L2 | 12.821 | 0.0780 | 1 |
| L1 | 24.054 | 0.0416 | 0.53 |
| L2 | 14.110 | 0.0709 | 0.91 |

Figure 5:
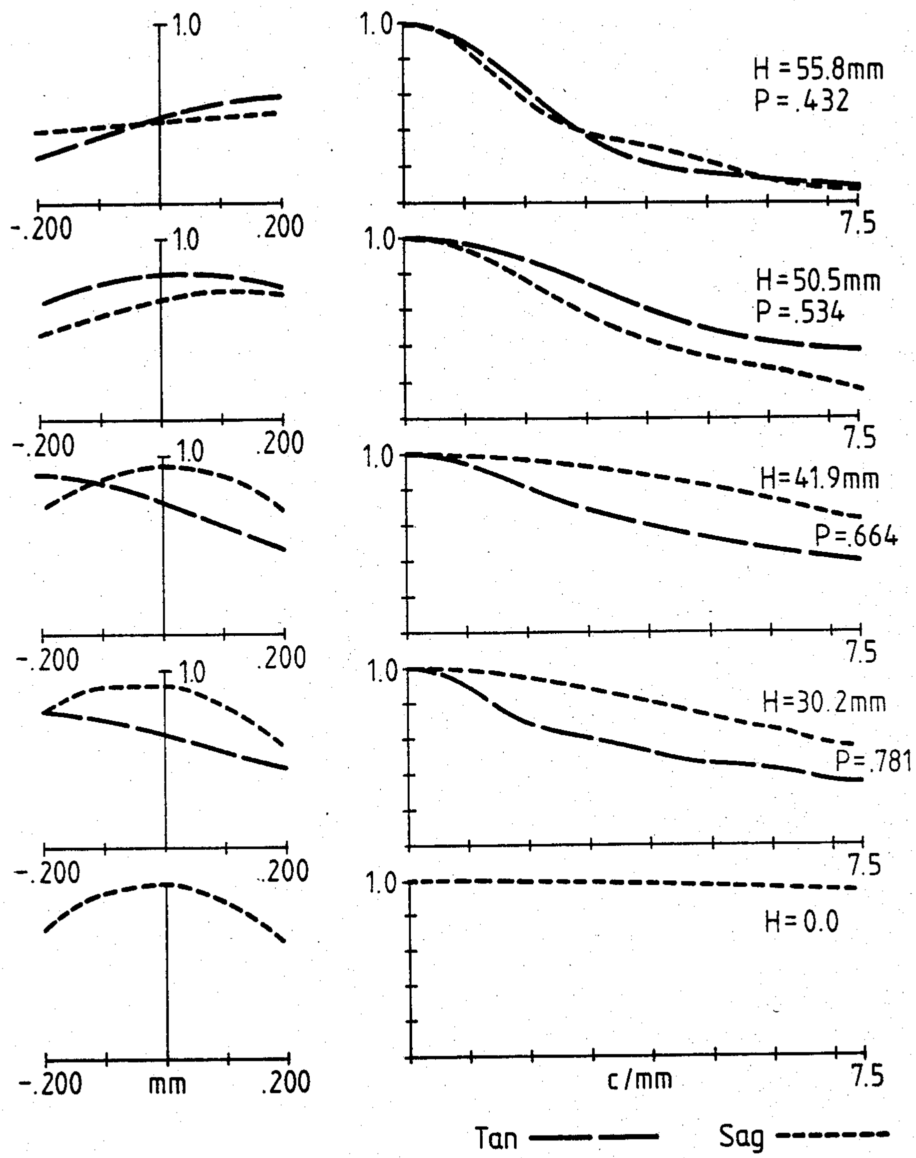
FIGS. 5 and 6 show the modulation transfer functions and defocus functions of the lens systems of FIGS. 3 and 4, respectively.
Figure 6:
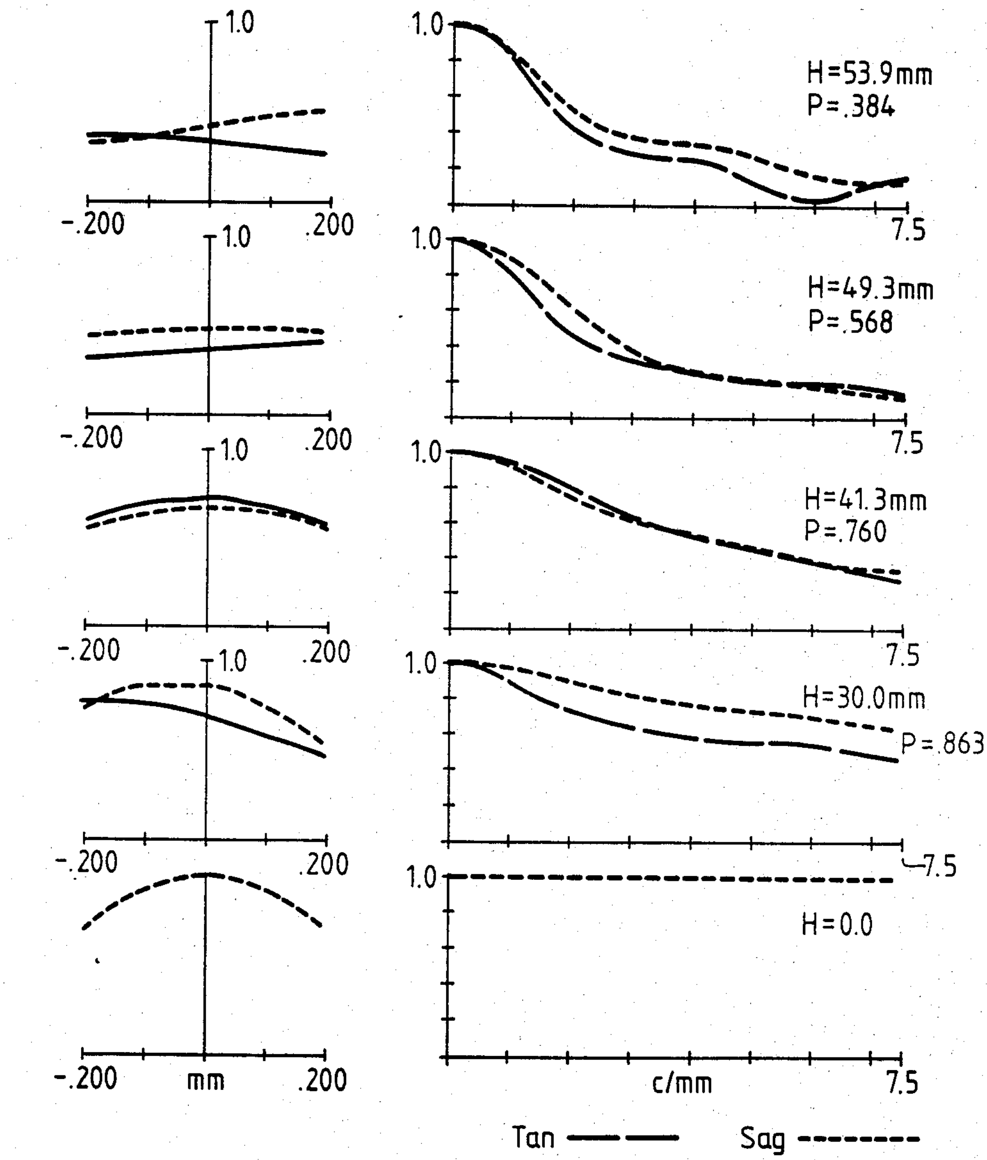

FIGS. 5 and 6 show the performance of the lenses of FIGS. 3 and 4, respectively. The column of five graphs on the right show the modulation transfer functions (MTF) plotted vertically at various distances H off axis at the CRT face plate as a function of spatial frequency for the tangential (Tan) and sagittal (Sag) directions. For each valve of H, the value of the effective lens aperture area P is given relative to the value on axis. The MTFs are plotted out to 7.5 cycles per mm on the CRT face plate. With a face plate diameter of 120 mm, a 625 line picture can be adequately resolved provided the MTF has a value 0.5 or better out to 2.5 cycles per mm. It will be seen that the FIG. 3 design achieves this target all over the picture with a substantial margin in most of the picture. The wider angle, shorter throw design of FIG. 4 has slightly lower resolution at the picture extremities. H=55 mm is roughly at the picture corners.

The column of five graphs on the left show the variation of the MTF as a function of defocus distance at the CRT face plate. The base value of the MTF is 2.5 cycles per mm. It will be seen that there is a substantial margin of about ±0.2 mm for defocus error and for face plate manufacturing tolerance.

Figure 7:
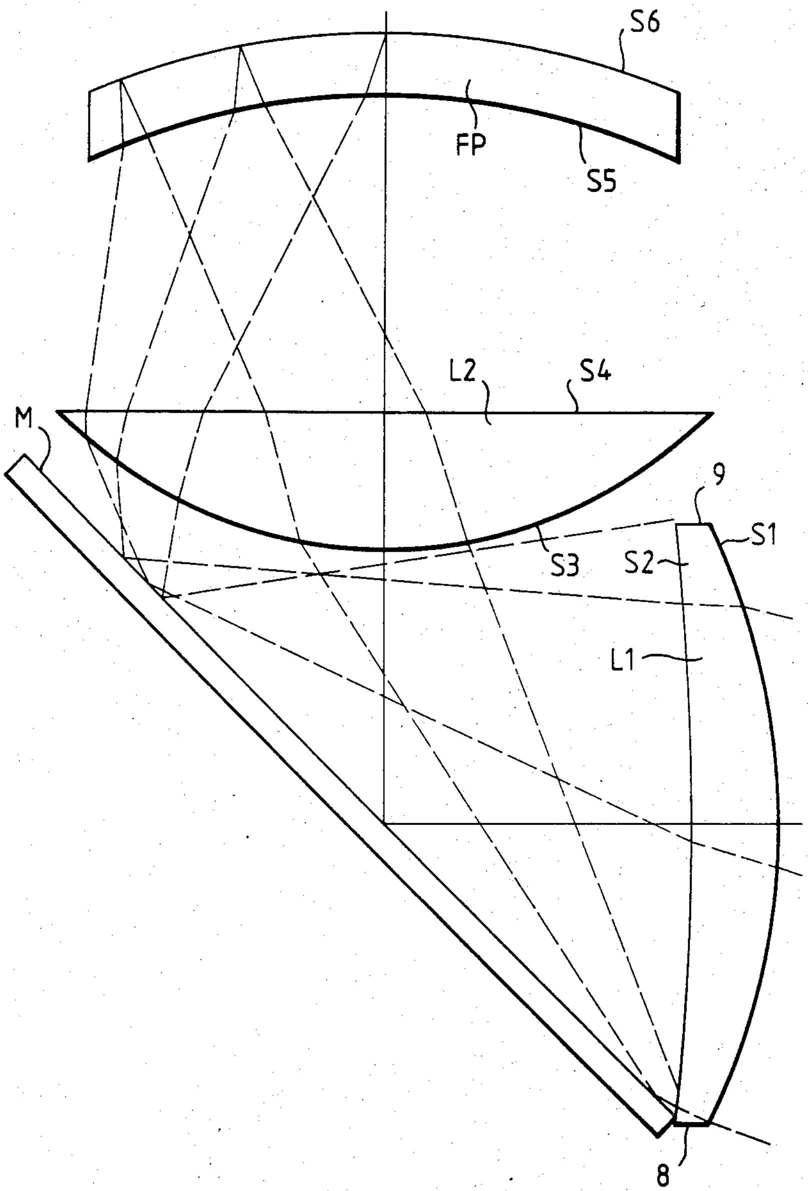
FIG. 7 shows a folded lens system.

FIG. 7 shows a design of lens in which the separation between L1 and L2 has been increased to allow a folding mirror M to be inserted at an angle of 45 degrees between them. In practice, a small segment is removed from the top 8 and bottom 9 of L1. The effect of the increased separation is to reduce the projection angle slightly and to increase the throw needed to give the same final size of picture as with the FIG. 3 and FIG. 4 designs.

Table III gives the details of this (FIG. 7) design.

TABLE III

Focal length 16.835 cm. Relative aperture f/1.0
Projection angle ±22.5°. Throw 1.37 m
Wavelength 525 nm. Magnification 9X.

| | | Polar radius, cm | Axial thickness, cm | Axial separation, cm | Refractive index |
|---|---|---|---|---|---|
| L1 | S1 | 16.148 | — | — | — |
| | S2 | 138.646 | 2.128 | — | 1.5727 |
| L2 | S3 | 10.818 | — | 13.664 | — |
| | S4 | −103.670 | 3.248 | — | 1.5727 |
| FP | S5 | −15.873 | — | 7.525 | — |
| | S6 | −17.857 | 1.500 | — | 1.5200 |

Aspheric surfaces: S2, S4

| | S2 | S4 |
|---|---|---|
| C | 0.00721 | −0.00965 |
| ε | 0 | 0 |
| $a_4$ | $+0.3477 \times 10^{-4}$ | $+0.9328 \times 10^{-4}$ |
| $a_6$ | $-0.4888 \times 10^{-8}$ | $-0.5375 \times 10^{-6}$ |
| $a_8$ | $+0.4453 \times 10^{-10}$ | $+0.3432 \times 10^{-8}$ |
| $a_{10}$ | 0 | 0 |

Element values:

| | Focal length, cm | Power, $cm^{-1}$ | Relative Power |
|---|---|---|---|
| L1 + L2 | 16.832 | 0.0594 | 1 |
| L1 | 31.712 | 0.0415 | 0.53 |
| L2 | 17.284 | 0.0579 | 0.97 |

Figure 8:
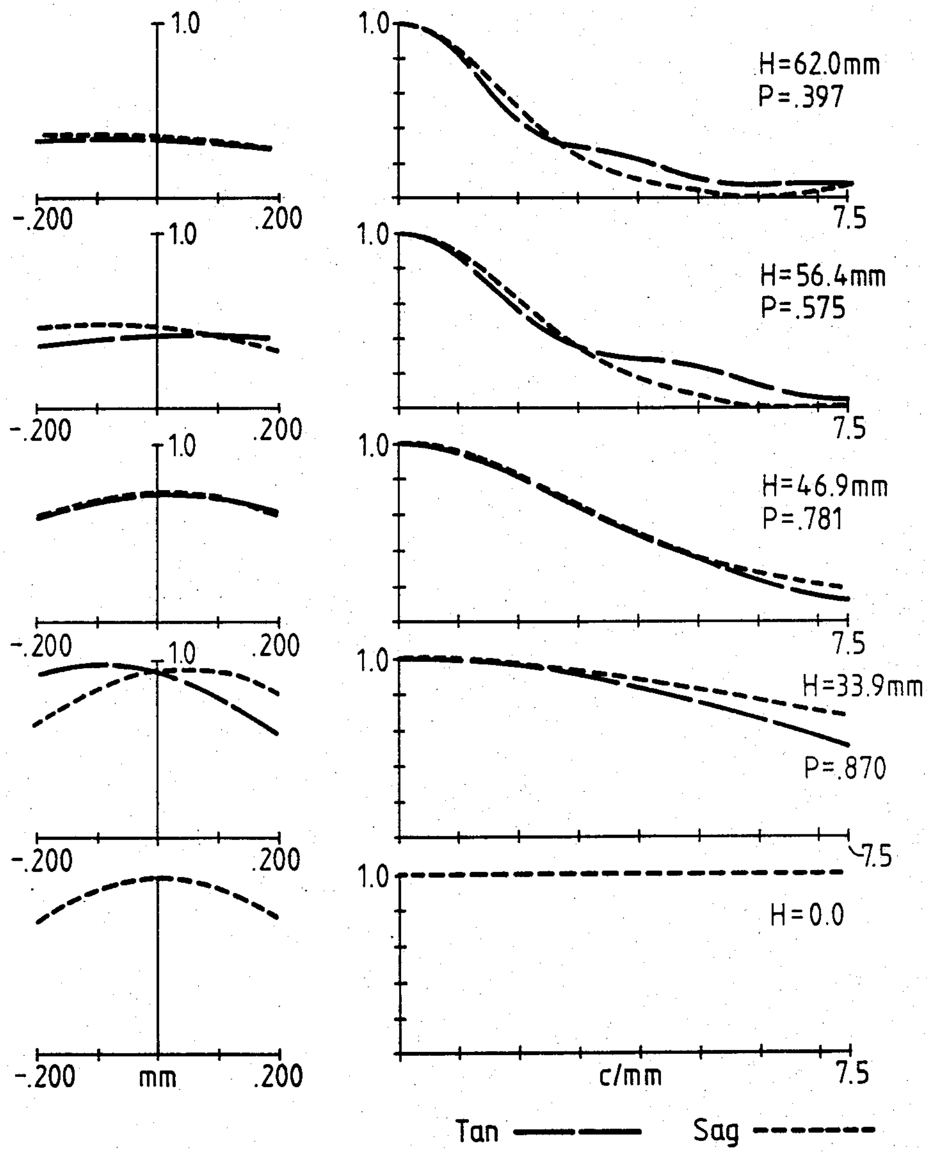
FIG. 8 shows the performance of the lens system of FIG. 7.

It will be seen from FIG. 8 that the performance of this design is only slightly lower than that of the FIG. 3 and FIG. 4 designs at the edges of the picture.

In the above designs, the aspheric can be on either side of each element. The CRT face plate can have concentric surfaces or each surface can have the same radius or slightly different radii consistent with the face plate thickness remaining substantially constant or chosen so that the face plate has weak positive or negative power. Either face plate surface may be aspherized to further improve resolution.

For three element lens designs generally suitable for higher definition or wider projection angle, reference may be made to copending British Patent Application No. 8,319,940.

I claim:

1. A lens system for projecting an image of a concave object surface onto a planar display screen, characterized in that the lens system comprises two elements, each of positive power and each having one aspheric surface, the powers of the elements being chosen so that $$0.4K < K_1 < 0.60K \text{ and}$$

$$0.75K < K_2 < 1.05K$$

where $K_1$ is the power of the element remote from the object surface, $K_2$ is the power of the element adjacent the object surface and K is the total power of the lens system, each aspheric surface being defined by the following relationship:

$$Z = \frac{Cs^2}{1 + \sqrt{1 - \epsilon C^2 s^2}} + a_4 s^4 + a_6 s^6 + a_8 s^8 + a_{10} s^{10}$$

where Z is a deviation, in the axial direction, of the surface from a plane normal to the optical axis and tangent to the surface at its pole for a zone of the surface which is at a distance s from the axis, C is a curvature of the surface on the axis, ε is a conic constant, and $a_4$, $a_6$, $a_8$ and $a_{10}$ are constants for the surface.

2. A lens system as claimed in claim 1, having focal length 14.045 cm at a wavelength of 525 nm, relative aperture f/0.94, projection angle ±23.7°, throw 1.3 m and magnification 9×, and being described substantially as follows:

| | | Polar radius, cm | Axial thickness, cm | Axial separation, cm | Refractive index |
|---|---|---|---|---|---|
| L1 | S1 | 12.603 | — | — | — |
| | S2 | 70.920 | 2.500 | — | 1.5756 |
| L2 | S3 | 10.005 | — | 9.763 | — |
| | S4 | −77.270 | 3.227 | — | 1.5756 |
| FP | S5 | −15.015 | — | 6.343 | — |
| | S6 | −15.748 | 1.200 | — | 1.5200 |

Aspheric surfaces: S2, S4

| | S2 | S4 |
|---|---|---|
| C | 0.0141 | −0.0129 |
| ε | 0 | 0 |
| $a_4$ | $+0.7023 \times 10^{-4}$ | $+0.1526 \times 10^{-3}$ |
| $a_6$ | $-0.1330 \times 10^{-7}$ | $-0.1411 \times 10^{-6}$ |
| $a_8$ | $+0.7157 \times 10^{-10}$ | $-0.1822 \times 10^{-7}$ |
| $a_{10}$ | $+0.2866 \times 10^{-11}$ | $+0.1406 \times 10^{-9}$ |

Element values:

| | Focal length, cm | Power, $cm^{-1}$ | Relative Power |
|---|---|---|---|
| L1 + L2 | 14.045 | 0.0712 | 1 |
| L1 | 26.216 | 0.0381 | 0.54 |
| L2 | 15.600 | 0.0641 | 0.90 |

where L1, L2, FP are successive lens elements from the image end and S1-S6 are successive element surfaces, positive surfaces being convex towards the image end and negative surfaces being concave towards the image end.

3. A lens system as claimed in claim 1, having focal length 12.821 cm at a wavelength of 525 nm, relative aperture f/0.94, projection angle ±25.7°, throw 1.19 m and magnification 9×, and having described substantially as follows:

| Polar radius, cm | Axial thickness, cm | Axial separation, cm | Refractive index |
|---|---|---|---|

-continued

| | | | | | |
|---|---|---|---|---|---|
| L1 | S1 | 10.853 | — | — | — |
| | S2 | 45.996 | 2.500 | — | 1.5756 |
| L2 | S3 | 8.839 | — | 8.704 | — |
| | S4 | −88.028 | 2.911 | — | 1.5756 |
| FP | S5 | −13.699 | — | 5.687 | — |
| | S6 | −15.016 | 1.200 | — | 1.5200 |

Aspheric surfaces: S2, S4

| | S2 | S4 |
|---|---|---|
| C | 0.0217 | −0.0114 |
| $\epsilon$ | 0 | 0 |
| $a_4$ | $+0.1021 \times 10^{-3}$ | $+0.2400 \times 10^{-3}$ |
| $a_6$ | $+0.3952 \times 10^{-7}$ | $-0.1089 \times 10^{-5}$ |
| $a_8$ | $+0.3938 \times 10^{-9}$ | $-0.2332 \times 10^{-7}$ |
| $a_{10}$ | $+0.8644 \times 10^{-11}$ | $+0.3722 \times 10^{-9}$ |

Element values:

| | Focal length, cm | Power, $cm^{-1}$ | Relative Power |
|---|---|---|---|
| L1 + L2 | 12.821 | 0.0780 | 1 |
| L1 | 24.054 | 0.0416 | 0.53 |
| L2 | 14.110 | 0.0709 | 0.91 |

where L1, L2, FP are successive lens elements from the image end and S1–S6 are successive element surfaces, positive surfaces being convex towards the image end and negative surfaces being concave towards the image end.

4. A lens system as claimed in claim 1, having focal length 16.835 cm at a wavelength of 525 nm, relative aperture f/1.0, projection angle ±22.5°, throw 1.37 m and magnification 9×, and being described substantially as follows:

| | | Polar radius, cm | Axial thickness, cm | Axial separation, cm | Refractive index |
|---|---|---|---|---|---|
| L1 | S1 | 16.148 | — | — | — |
| | S2 | 138.646 | 2.128 | — | 1.5727 |
| L2 | S3 | 10.818 | — | 13.664 | — |
| | S4 | −103.670 | 3.248 | — | 1.5727 |
| L3 | S5 | −15.873 | — | 7.525 | — |
| | S6 | −17.857 | 1.500 | — | 1.5200 |

Aspheric surfaces: S2, S4

| | S2 | S4 |
|---|---|---|
| C | 0.00721 | −0.00965 |
| $\epsilon$ | 0 | 0 |
| $a_4$ | $+0.3477 \times 10^{-4}$ | $+0.9328 \times 10^{-4}$ |
| $a_6$ | $-0.4888 \times 10^{-8}$ | $-0.5375 \times 10^{-6}$ |
| $a_8$ | $+0.4453 \times 10^{-10}$ | $+0.3432 \times 10^{-8}$ |
| $a_{10}$ | 0 | 0 |

Element values:

| | Focal length, cm | Power, $cm^{-1}$ | Relative Power |
|---|---|---|---|
| L1 + L2 | 16.832 | 0.0594 | 1 |
| L1 | 31.712 | 0.0315 | 0.53 |
| L2 | 17.284 | 0.0579 | 0.97 |

where L1, L2, FP are successive lens elements from the image end and S1–S6 are successive element surfaces positive surfaces being convex towards the image end and negative surfaces being concave towards the image end.

5. A lens system as claimed in claim 1 or claim 4, characterized in that the lens system is folded by a plane mirror inserted between the two transmissive elements at an angle to the optical axis.

6. A projection television system comprising a cathode ray tube having a face plate concave towards the direction of a projected image, and a lens system associated with the cathode ray tube, characterized in that the lens system comprises two elements, each of positive power and each having one aspheric surface, the powers of the elements being chosen so that $$0.4K < K_1 < 0.60K \text{ and}$$

$$0.75K < K_2 < 1.05K$$

where $K_1$ is the power of the element remote from the object surface, $K_2$ is the power of the element adjacent the object surface and K is the total power of the lens system, each aspheric surface being defined by the following relationship:

$$Z = \frac{Cs^2}{1 + \sqrt{1 - \epsilon C^2 s^2}} + a_4 s^4 + a_6 s^6 + a_8 s^8 + a_{10} s^{10}$$

where Z is a deviation, in the axial direction, of the surface from a plane normal to the optical axis and tangent to the surface at its pole for a zone of the surface which is at a distance s from the axis, C is a curvature of the surface on the axis, $\epsilon$ is a conic constant, and $a_4$, $a_6$, $a_8$ and $a_{10}$ are constants for the surface.

7. A color television projection system comprising first, second and third cathode ray tubes having red, blue and green phosphors, respectively, provided on concave face plates, a lens system associated with each face plate, each lens system being arranged to project an image of the associated concave face plate onto a common display screen, characterized in that each lens system comprises two elements, each of positive power and each having one aspheric surface, the powers of the elements being chosen so that $$0.4K < K_1 < 0.60K \text{ and}$$

$$0.75K < K_2 < 1.05K$$

where $K_1$ is the power of the element remote from the object surface, $K_2$ is the power of the element adjacent the object surface and K is the total power of the lens system, each aspheric surface being defined by the following relationship:

$$Z = \frac{Cs^2}{1 + \sqrt{1 - \epsilon C^2 s^2}} + a_4 s^4 + a_6 s^6 + a_8 s^8 + a_{10} s^{10}$$

where Z is a deviation, in the axial direction, of the surface from a plane normal to the optical axis and tangent to the surface at its pole for a zone of the surface which is at a distance s from the axis, C is a curvature of the surface on the axis, $\epsilon$ is a conic constant, and $a_4$, $a_6$, $a_8$ and $a_{10}$ are constants for the surface.

* * * * *